United States Patent
Samuel et al.

(10) Patent No.: US 10,280,730 B2
(45) Date of Patent: May 7, 2019

(54) OPTIMIZED UBD OPERATION ENVELOPE

(71) Applicant: LANDMARK GRAPHICS CORPORATION, Houston, TX (US)

(72) Inventors: Robello Samuel, Cypress, TX (US); Xiaoqian Huang, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 159 days.

(21) Appl. No.: 15/309,161

(22) PCT Filed: Jun. 4, 2014

(86) PCT No.: PCT/US2014/040934
§ 371 (c)(1),
(2) Date: Nov. 4, 2016

(87) PCT Pub. No.: WO2015/187157
PCT Pub. Date: Dec. 10, 2015

(65) Prior Publication Data
US 2017/0074085 A1  Mar. 16, 2017

(51) Int. Cl.
*E21B 44/00* (2006.01)
*E21B 21/08* (2006.01)
(Continued)

(52) U.S. Cl.
CPC .............. *E21B 44/00* (2013.01); *E21B 21/08* (2013.01); *E21B 43/12* (2013.01); *E21B 43/30* (2013.01);
(Continued)

(58) Field of Classification Search
CPC .... E21B 2021/006; E21B 44/00; E21B 21/08; E21B 33/085; B01D 53/229
(Continued)

(56) References Cited

U.S. PATENT DOCUMENTS 7,363,988 B2 * 4/2008 Jeffryes ................ E21B 44/00
175/39
9,175,557 B2 * 11/2015 Iversen ................ E21B 44/00
(Continued)

FOREIGN PATENT DOCUMENTS

WO   WO-2010019900 A1 *  2/2010  ............. E21B 21/08

OTHER PUBLICATIONS

Vega, M. P., Galdino de Freitas, M., Fernandes, L. D., Scheid, C. M., Martins, A. L., Automatic Monitoring and Control of Annulus Bottom Hole Pressure for Safe Oil Well Drilling Operations, 2012, Chemical Engineering Transactions, vol. 26, pp. 339-344. (Year: 2012).*

(Continued)

*Primary Examiner* — Jay Hann
*Assistant Examiner* — Stephen D. Ford
(74) *Attorney, Agent, or Firm* — Locke Lord LLP; Daniel Nguyen; Judy R. Naamat

(57) ABSTRACT

One implementation of the disclosure provides a computer implemented method for underbalanced drilling. The implementation may include determining an initial 2D UBD operation envelope based on a set of initial operating points for a selected TVD or time, displaying the initial 2D UBD operation envelope on a computer display, providing at least one data point representing actual data from a well, determining at least one actual UBD operation point using the at least one data point and displaying it on the computer display along with the 2D UBD operation envelope, selecting an optimization parameter, determining a set of optimized operating points based on the optimization parameter, and displaying the set of optimized operating points on the computer display along with the 2D UBD operation envelope.

15 Claims, 6 Drawing Sheets

(51) Int. Cl.
*E21B 43/12* (2006.01)
*E21B 43/30* (2006.01)
*E21B 21/00* (2006.01)

(52) U.S. Cl.
CPC ............. *E21B 2021/006* (2013.01); *G05B 2219/45129* (2013.01)

(58) Field of Classification Search
USPC .............. 175/48; 702/9; 96/7; 166/105
See application file for complete search history.

(56) References Cited

U.S. PATENT DOCUMENTS

| | | | | |
|---|---|---|---|---|
| 9,328,573 | B2 * | 5/2016 | Standifird | E21B 21/08 |
| 2003/0233194 | A1 * | 12/2003 | Cook | E21B 49/006 |
| | | | | 702/16 |
| 2005/0269134 | A1 | 12/2005 | Strazhgorodskiy et al. | |
| 2008/0289875 | A1 | 11/2008 | Burge et al. | |
| 2011/0220410 | A1 | 9/2011 | Aldred et al. | |
| 2014/0027174 | A1 * | 1/2014 | Ringer | E21B 4/02 |
| | | | | 175/26 |
| 2014/0125265 | A1 | 5/2014 | Al-Yami et al. | |
| 2015/0134258 | A1 * | 5/2015 | Luppens | E21B 49/003 |
| | | | | 702/11 |

OTHER PUBLICATIONS

Lyons, W. C., Working Guide to Drilling Equipment and Operations, 2010, Elsevier, pp. 55,208,224. (Year: 2010).*
Park, Tae Wook, PCT Search Report for PCT Application No. PCT/US2014/040934 dated Feb. 27, 2015.
Park, Tae Wook, PCT Written Opinion for PCT Application No. PCT/US2014/040934 dated Feb. 27, 2015.

* cited by examiner

OPTIMIZED UBD OPERATION ENVELOPE

TECHNICAL FIELD

The embodiments disclosed herein relate generally to methods and systems for optimizing Underbalanced Drilling ("UBD").

BACKGROUND

Underbalanced drilling is a technique used to drill oil and gas wells. Unlike traditional overbalanced drilling, the wellbore pressure is kept lower than the formation pressure. Underbalanced drilling provides several advantages over overbalanced drilling. It reduces drilling fluid invasion of the wellbore, which decreases wellbore damage and can reduce clean up time and improve recovery. It also allows the well to produce during drilling, which can increase the knowledge about the well itself.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the disclosure.

Figure 1:
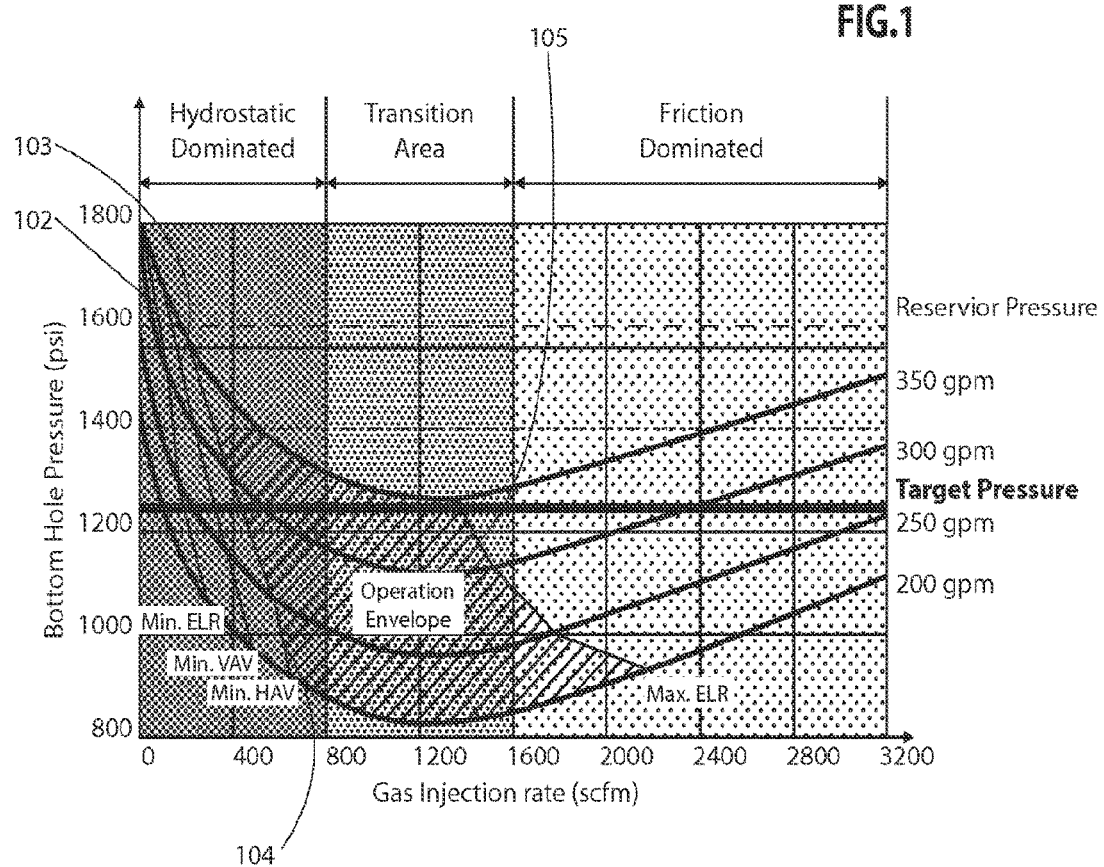
FIG. 1 is a graph illustrating a two-dimensional ("2D") operating envelope according to an embodiment.

Embodiments of the disclosure provide computer implemented methods to determine an optimized operation envelope for underbalanced drilling ("UBD"). In one implementation, the method includes determining an initial two-dimensional, underbalanced drilling ("2D UBD") operation envelope based on a set of initial operating points at either a selected true vertical depth ("TVD") or a time. The initial 2D UBD operation envelope is then displayed on a computer display, such as a conventional computer monitor, or may be printed out if desired. An exemplary 2D UBD display is shown in FIG. 1. FIG. 1 shows an embodiment having a displayed graph indicating the bottom hole pressure ("BHP") along the y-axis and the gas injection rate ("GIR") along the x-axis. The BHP is indicated in pounds per square inch ("psi") and the gas injection rate is given in standard cubic feet per minute ("scfm"). Also displayed are a series of curves indicating the liquid flow rate ("LIR") of the mud pump. In FIG. 1, the LIR ranges from 200 gallons per minute ("gpm") to 350 gpm.

FIG. 1 also shows the 2D UBD operation envelope for this embodiment. The 2D UBD operation envelope is bounded by the curves for the minimum motor equivalent liquid rate 102 ("Min. ELR"), minimum vertical liquid velocity 103 (or minimum vertical hole cleaning velocity) ("Min. VAV"), minimum horizontal liquid velocity 104 (or minimum horizontal hole cleaning velocity) ("Min. HAV"), and maximum motor ELR 105 ("Max. ELR"). The operation envelope represents the desired range of operating conditions for the mud pump, LIR, and BHP in an underbalanced oil and gas well.

Once the well is in operation, however, actual data about the well's operating conditions will be available to the well operator. Further, well operating conditions may also change overtime while the well is producing. Therefore, actual operating data from the well may be used to update the operation envelope.

Figure 2:
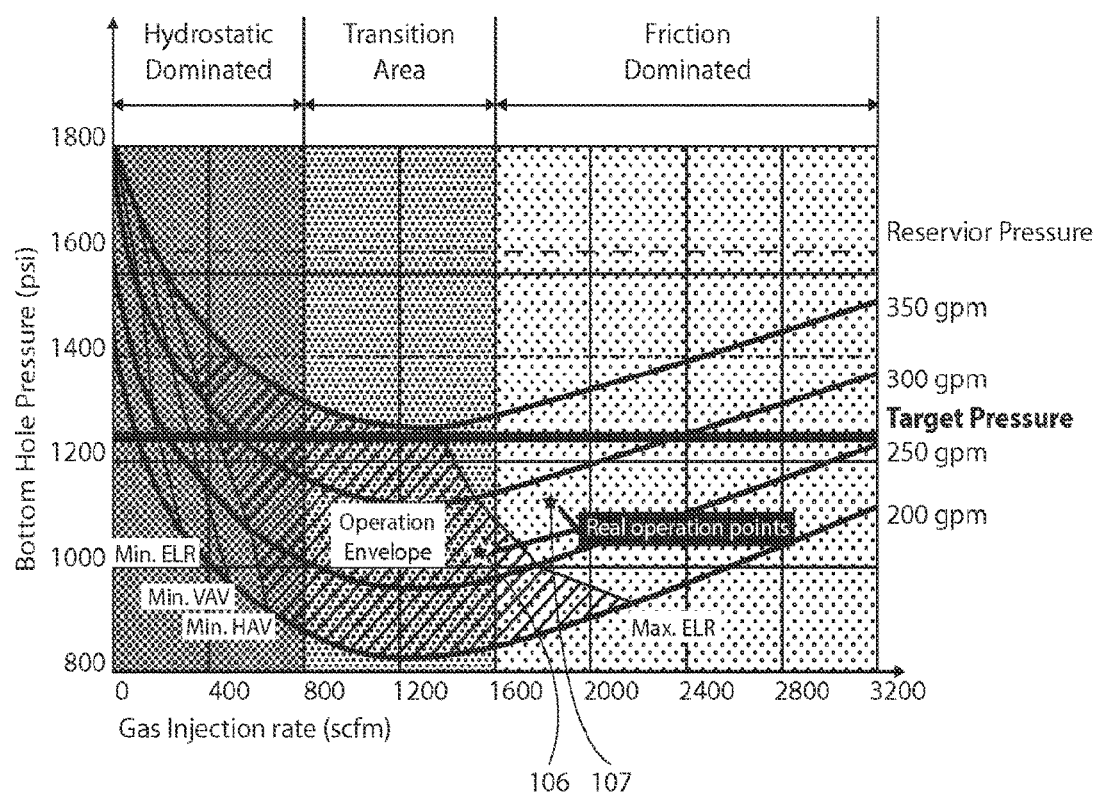
FIG. 2 is a graph illustrating a 2D operation envelope with real operation points according to an embodiment.

FIG. 2 shows an operation chart as in FIG. 1 with actual operating data points 106 and 107 plotted on it. Operating data points 106 and 107 represent operating conditions at different times or depths. They are depicted simultaneously in FIG. 2 for purposes of illustration, though in an actual embodiment, the display may depict only a single operating data point. The data regarding the actual well conditions is provided to the well operator by various pressure sensors, flow sensors, and other sensors that transmit data to a computer system at the well site. This information can be processed at the site, or it can be transmitted to a remote computer system for further processing. Each of data points 106 and 107 will be determined from a set of actual UBD inputs. For each set of actual UBD inputs, there will be a fixed gas injection rate and a fixed liquid injection rate. Thus, data points 106 and 107 will have coordinates represented by GIR and BHP on the 2D UBD envelope shown in FIG. 2.

Figure 5:
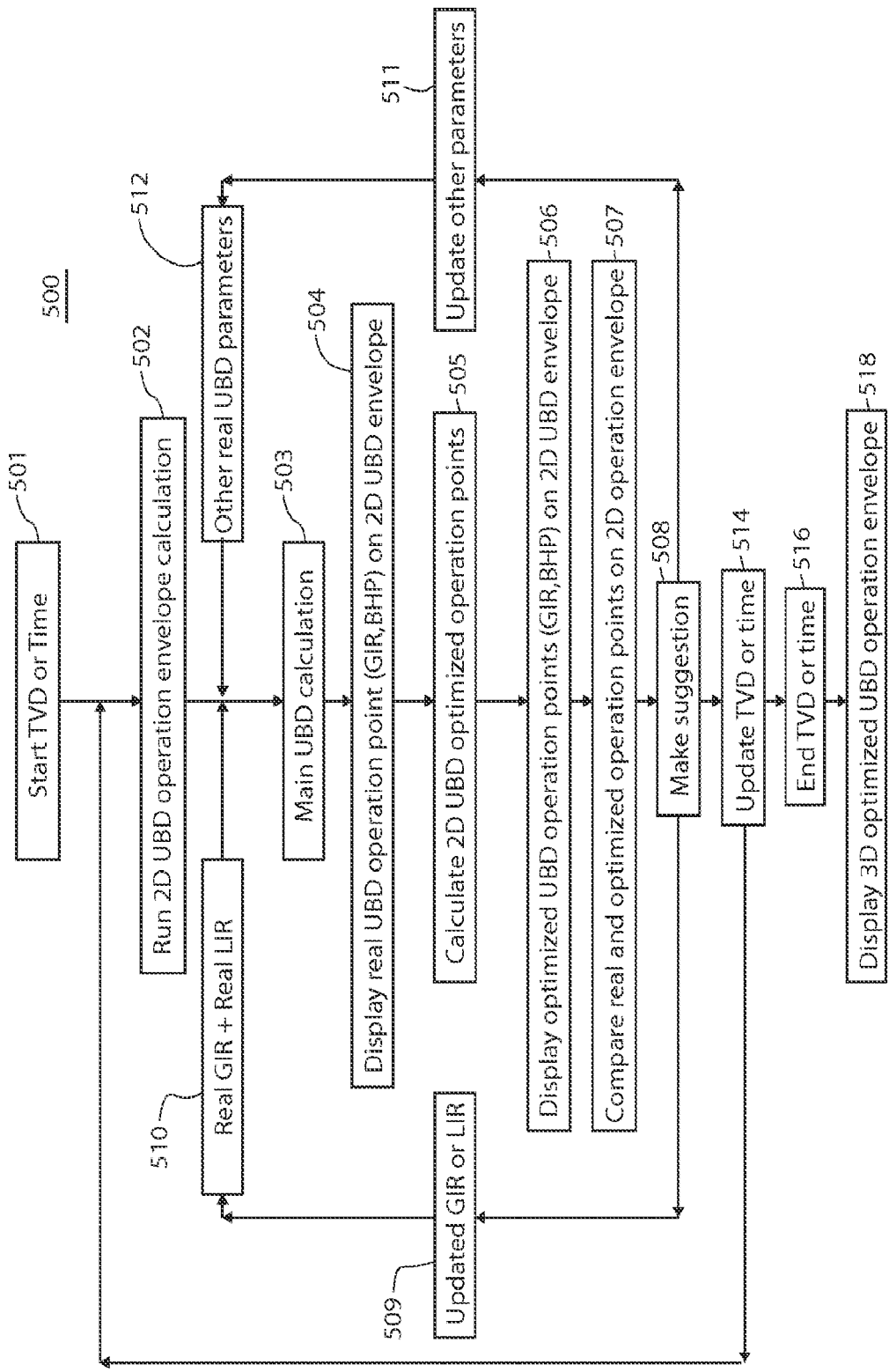
FIG. 5 is a flow chart for a computer-implemented method for optimizing UBD according to an embodiment.

FIG. 5 is a workflow diagram 500 according to an embodiment of the method.

The method begins by selecting a desired true vertical depth (TVD) or time for which to calculate the 2D UBD envelope in step 501. Next, in step 502, a 2D UBD envelope is calculated using a suitable UBD calculation engine, for example, a DECISIONSPACE® Well Engineering (DSWE), UBD calculation engine, available from Landmark Graphics, Corp. At the end of step 502, a graph of the operation envelope similar to that shown in FIG. 1 may be presented to the well operator using a suitable computer display.

In step 503, the actual UBD operating point is calculated using well data for the GIR, LIR, and other parameters, such as Min. and Max. ELR, VAV, and HAV. The actual values for GIR and LIR provided at step 503 are fixed, and allow the determination of the actual UBD operating point, with coordinates represented by GIR and BHP. The actual UBD operating point is displayed to the well operator in step 504 on the BHP/GIR chart generated in step 502. An exemplary display of the actual UBD operating point is shown in FIG. 2. This allows the well operator to determine how the well is performing with respect to the UBD envelope.

In embodiments of the method, optimized 2D UBD operation points are be determined in step 505. The optimized UBD operation points may represent the best points to achieve selected well operating conditions, such as, the maximum motor performance, vertical hole cleaning capability, or horizontal hole cleaning capability. The optimized UBD points will have GIR/BHP coordinates, but may have different values from the UBD point determined in step 503.

Figure 3:
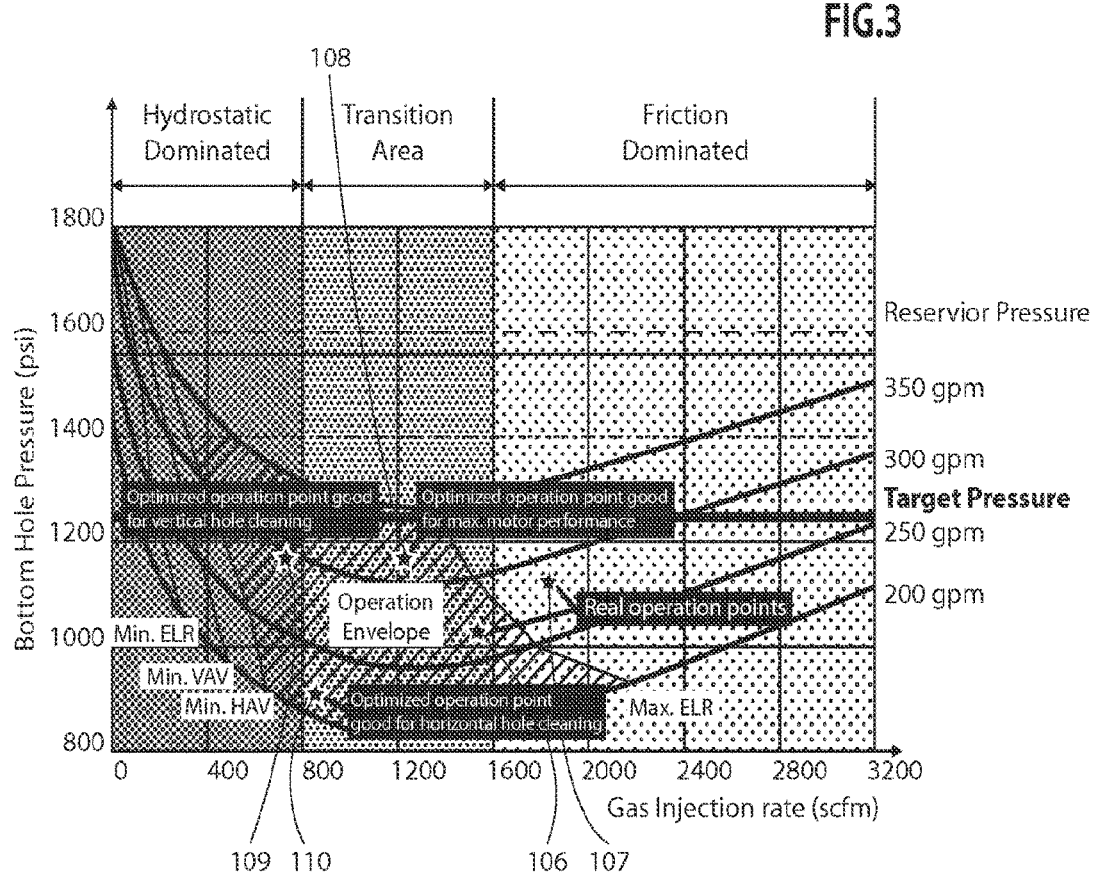
FIG. 3 is a graph illustrating a 2D operation envelope with optimized operation points, according to an embodiment.

FIG. 3 shows a BHP/GIR chart with optimized UBD operation points 108, 109, and 110. Operating point 108 is optimized for maximum motor performance. Operating point 109 is optimized for vertical hole cleaning, and operating point 110 is optimized for horizontal hole cleaning The optimized UBD operating points may be determined by the UBD engine by selecting a parameter to be optimized, such as GIR, which will, in turn, help provide an optimal operating condition, such as horizontal hole cleaning. Then the UBD operating parameter may then be assigned an initial value within the operation envelope. The remaining operating parameters, BHP and LIR, are then calculated by the UBD engine. This is an iterative process, and the initial value is then changed, and the remaining parameters recalculated until the optimal set of parameters are determined. This process may be performed using, for example, a branch and bound algorithm, triangulation algorithm, divide-and-conquer algorithm, or other similar optimization algorithm.

Once the optimized parameters are obtained to establish the optimized operating points for achieving the selected well conditions, each of the optimized operating points is displayed on the operation envelope in step 506, such as shown in FIG. 3. This provides the well operator with a visual indication of the current operating point, such as operating point 106, and its location relative to the optimized operation points 108, 109, and 110. This also allows a comparison to be made, in step 507, of the actual and optimized operation points so that operating conditions of the well may be altered, if desired.

Step 508 allows for operator input based on the comparison. For example, referring again to FIG. 3, if the well actual operating point is operating point 106, the operator may select to lower the GIR to shift the actual operating point toward optimized operating point 110, so that the horizontal hole cleaning is optimized. A selected GIR is provided at step 508, and well parameters, such as GIR, LIR, are recalculated in steps 509 and 511 then, in steps 510 and 512 provided as inputs to the main UBD engine in step 503. Steps 504 through 507 are then repeated, allowing the operator to analyze the effect of a change in GIR.

The above steps are described with respect to a single time or TVD. A method according to the disclosure may be performed for a plurality of times or TVDs. For example, the method may proceed to step 514, in which a new TVD or time is entered. The new TVD or time provided in step 514 may be entered manually by the well operator, or automatically, for example, by an iterative algorithm based on a preselected time or depth increment. When optimized 2D UBD operation points and actual 2D UBD operation points have been determined for all TVDs or times desired, then further calculations are ceased in step 516, and the method proceeds to step 518, where a 3D optimized UBD operation envelope may be displayed.

Figure 4:
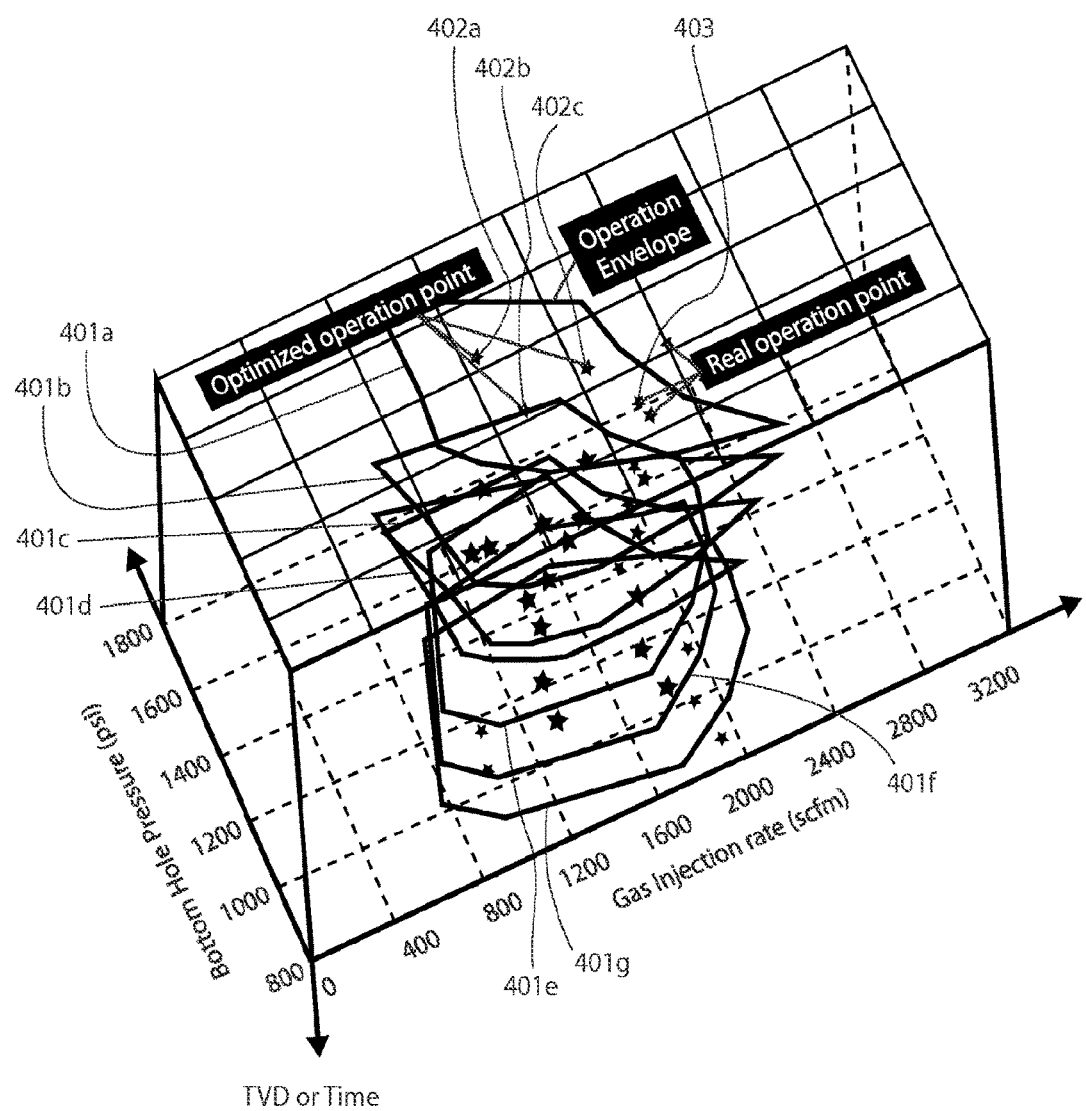
FIG. 4 is a graph illustrating a three-dimensional (3D) operation envelope according to an embodiment.

FIG. 4 is a diagram illustrating a 3D UBD operation envelope according to an embodiment. The example 3D UBD operation envelope is depicted by stacking a plurality of 2D UBD operation envelopes 401a-401g determined at different times or depths. Each of the 2D UBD operation envelopes displays the actual operating point and the optimized UBD operating points for that time or depth. For example, operation envelope 401a shows optimized operating points 402a, 402b, and 402c, along with actual operating point 403. This allows a well operator to determine how the optimized and actual operation points change with depth and to adjust the UBD strategy accordingly.

Figure 6:
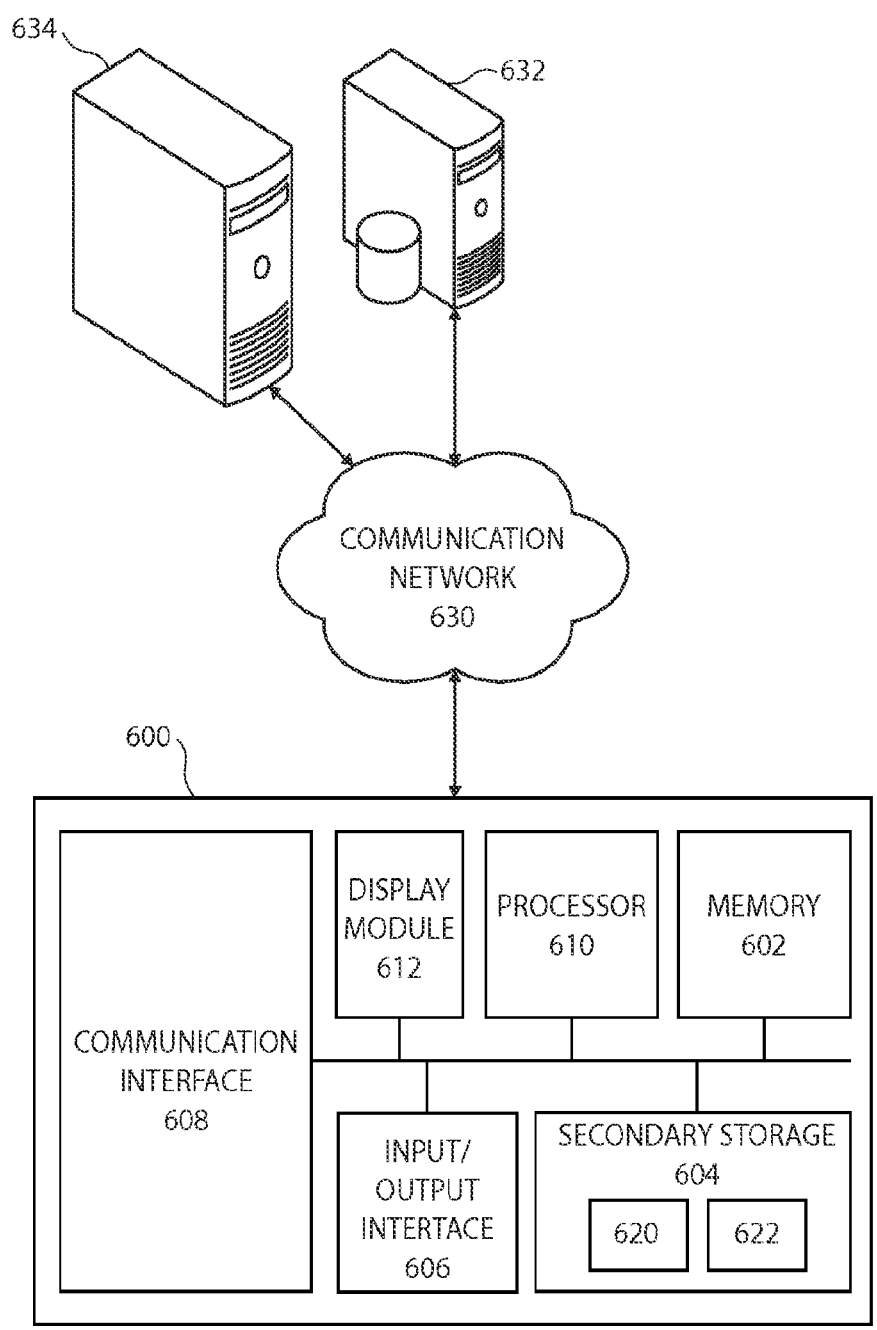
FIG. 6 is a diagram illustrating a system for implementing an embodiment of the method.

FIG. 6 is a block diagram illustrating one embodiment of a system 600 for implementing the features and functions of the disclosed embodiments. The system 600 may be any type of computing device such as, but not limited to, a personal computer, a server system, a client system, a laptop, a tablet, and a smartphone. The system 600 includes, among other components, a processor 610, main memory 602, secondary storage unit 604, an input/output interface module 606, and a communication interface module 608. The processor 610 may be any type or any number of single core or multi-core processors capable of executing instructions for performing the features and functions of the disclosed embodiments.

The input/output interface module 606 enables the system 600 to receive user input (e.g., from a keyboard and mouse) and output information to one or more devices such as, but not limited to, printers, external data storage devices, and audio speakers. The system 600 may optionally include a separate display module 612 to enable information to be displayed on an integrated or external display device. For instance, the display module 612 may include instructions or hardware (e.g., a graphics card or chip) for providing enhanced graphics, touchscreen, and/or multi-touch functionalities associated with one or more display devices.

Main memory 602 is volatile memory that stores currently executing instructions/data or instructions/data that are prefetched for execution. The secondary storage unit 604 is non-volatile memory for storing persistent data. The secondary storage unit 604 may be or include any type of data storage component such as a hard drive, a flash drive, or a memory card. In one embodiment, the secondary storage unit 604 stores the computer executable code/instructions and other relevant data for enabling a user to perform the features and functions of the disclosed embodiments.

For example, in accordance with the disclosed embodiments, the secondary storage unit 604 may permanently store the executable code/instructions associated with an application 620 for performing the above-described methods. The instructions associated with the application 620 are loaded from the secondary storage unit 604 to main memory 602 during execution by the processor 610 for performing the disclosed embodiments.

The communication interface module 608 enables the system 600 to communicate with the communications network 630. For example, the network interface module 608 may include a network interface card and/or a wireless transceiver for enabling the system 600 to send and receive data through the communications network 630 and/or directly with other devices.

The communications network 630 may be any type of network including a combination of one or more of the following networks: a wide area network, a local area network, one or more private networks, the Internet, a telephone network such as the public switched telephone network (PSTN), one or more cellular networks, and wireless data networks. The communications network 630 may include a plurality of network nodes (not depicted) such as routers, network access points/gateways, switches, DNS servers, proxy servers, and other network nodes for assisting in routing of data/communications between devices.

For example, in one embodiment, the system 600 may interact with one or more servers 634 or databases 632 for performing the features of the present disclosure. For instance, the system 600 may query the database 632 to obtain well data for updating the three dimensional view of the operating envelope in real-time in accordance with the disclosed embodiments. Further, in certain embodiments, the system 600 may act as a server system for one or more client devices or a peer system for peer to peer communications or parallel processing with one or more devices/computing systems (e.g., clusters, grids).

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be thought of as "products" or "articles of manufacture" typically in the form of executable code and/or associated data that is carried on or embodied in a type of tangible non-transitory machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the executable code.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As set forth above, the embodiments disclosed herein may be implemented in a number of ways. In general, in one aspect, the disclosed embodiments are directed to a computer-implemented method for underbalanced drilling.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claims set forth below.

What is claimed is:

1. A computer implemented method for underbalanced drilling, comprising:
 determining an initial two-dimensional underbalanced drilling (2D UBD) operation envelope based on a set of initial operating points for a selected true vertical depth (TVD) or time;
 displaying the initial 2D UBD operation envelope on a computer display;
 providing at least one data point representing actual data from a well;
 determining at least one actual UBD operation point using the at least one data point and displaying the at least one actual UBD operation point on the computer display along with the 2D UBD operation envelope;
 receiving an optimization parameter;
 determining a set of optimized operating points based on the optimization parameter;
 displaying the set of optimized operating points on the computer display along with the 2D UBD operation envelope and along with the at least one actual UBD operation point so that a visual indication of a location of the at least one actual UBD operation point is displayed relative to visual indications of locations of each of the set of optimized operating points;
 comparing the at least one actual UBD operation point and the optimized operating points; and
 adjusting operating conditions of the well by adjusting the outputs for controlling at least one of operation of a mud motor, gas injector and liquid injector based on a result of the comparison.

2. The computer implemented method according to claim 1, further comprising simultaneously displaying the set of optimized operating points on the computer display at multiple selected TVDs or times to create a three-dimensional underbalanced drilling (3D UBD) operation envelope image.

3. The computer implemented method according to claim 1, wherein the at least one data point represents real-time data.

4. The computer implemented method according to claim 1, wherein the at least one data point represents actual motor performance data.

5. The computer implemented method according to claim 1, wherein the at least one data point represents actual horizontal or vertical hole cleaning data.

6. A computer-readable storage medium that provides instructions, which when executed by one or more processors, cause said one or more processors to perform operations comprising:
 determining an initial two-dimensional underbalanced drilling (2D UBD) operation envelope based on a set of initial operating points for a selected true vertical depth (TVD) or time;
 displaying the initial 2D UBD operation envelope on a computer display;
 providing at least one data point representing actual data from a well;
 determining at least one actual UBD operation point using the at least one data point and displaying the at least one actual UBD operation point on the computer display along with the 2D UBD operation envelope;
 receiving an optimization parameter; determining a set of optimized operating points based on the optimization parameter;
 displaying the set of optimized operating points on the computer display along with the 2D UBD operation envelope and along with the at least one actual UBD operation point so that a visual indication of a location of the at least one actual UBD operation point is displayed relative to visual indications of locations of each of the set of optimized operating points;

comparing the at least one actual UBD operation point and the optimized operating points; and adjusting operating conditions of the well by adjusting the outputs for controlling at least one of operation of a mud motor, gas injector and liquid injector based on a result of the comparison.

7. The computer-readable storage medium according to claim 6, wherein the instructions, when executed by the one or more processors further cause the one or more processors to perform operations comprising simultaneously displaying the set of optimized operating points on the computer display at multiple selected TVDs or times to create a 3D UBD operation envelope image.

8. The computer-readable storage medium according to claim 6, wherein the at least one data point represents real-time data.

9. The computer-readable storage medium according to claim 6, wherein the at least one data point represents actual motor performance data.

10. The computer-readable storage medium according to claim 6, wherein the at least one data point represents actual horizontal or vertical hole cleaning data.

11. A system for underbalanced drilling in an oil and gas well, comprising:

a mud motor;

a gas injector;

a liquid injector;

a computer system having inputs for receiving inputs representative of the performance of the mud motor, gas injector and liquid injector, and having outputs for controlling the operation of the mud motor; gas injector and liquid injector;

wherein the computer system includes a processor that:

(a) determines an initial two-dimensional underbalanced drilling (2D UBD) operation envelope based on a set of initial operating points for a selected true vertical depth (TVD) or time, (b) displays the initial 2D UBD operation envelope on a computer display, (c) receives at least one data point representing actual data from a well;

(d) determines at least one actual UBD operation point using the at least one data point and displaying the at least one actual UBD operation point on the computer display along with the 2D UBD operation envelope, (e) receives an optimization parameter as an input, (f) determines a set of optimized operating points based on the optimization parameter, (g) displays the set of optimized operating points on the computer display along with the 2D UBD operation envelope and along with the at least one actual UBD operation point so that a visual indication of a location of the at least one actual UBD operation point is displayed relative to visual indications of locations of each of the set of optimized operating points;

(h) compares the at least one actual UBD operation point and the optimized operating points; and (i) adjusts operating conditions of the well by adjusting the outputs for controlling at least one of operation of the mud motor, gas injector and liquid injector based on a result of the comparison.

12. The system for underbalanced drilling in an oil and gas well according to claim 11, wherein the processor further simultaneously displays the set of optimized operating points on the computer display at multiple selected TVDs or times to create a 3D UBD operation envelope image.

13. The system for underbalanced drilling in an oil and gas well according to claim 11, wherein the at least one data point represents real-time data.

14. The system for underbalanced drilling in an oil and gas well according to claim 11, wherein the at least one data point represents actual motor performance data.

15. The system for underbalanced drilling in an oil and gas well according to claim 11, wherein the at least one data point represents actual horizontal or vertical hole cleaning data.

* * * * *